(12) United States Patent
Zhang

(10) Patent No.: US 8,907,593 B2
(45) Date of Patent: Dec. 9, 2014

(54) DRIVING CIRCUIT FOR LED BACKLIGHT, LCD DEVICE, AND METHOD FOR MANUFACTURING DRIVING CIRCUIT FOR LED BACKLIGHT

(75) Inventor: Xianming Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 182 days.

(21) Appl. No.: 13/577,469

(22) PCT Filed: Jun. 26, 2012

(86) PCT No.: PCT/CN2012/077498
§ 371 (c)(1),
(2), (4) Date: Aug. 7, 2012

(87) PCT Pub. No.: WO2013/189092
PCT Pub. Date: Dec. 27, 2013

(65) Prior Publication Data
US 2013/0343039 A1    Dec. 26, 2013

(30) Foreign Application Priority Data
Jun. 21, 2012 (CN) .......................... 2012 1 0208002

(51) Int. Cl.
H05B 37/02 (2006.01)

(52) U.S. Cl.
USPC .......................................... 315/308; 315/291

(58) Field of Classification Search
CPC .......... G09G 3/34; G09G 3/3406; G09G 3/36
USPC ........... 315/291, 307, 308, 185 R, 209 R, 312
See application file for complete search history.

(56) References Cited

U.S. PATENT DOCUMENTS

| 2009/0116222 A1 | 5/2009 | Hamada | |
| 2009/0179595 A1* | 7/2009 | Hite et al. | 315/308 |
| 2010/0148679 A1 | 6/2010 | Chen et al. | |
| 2011/0163682 A1* | 7/2011 | Jungwirth | 315/192 |

FOREIGN PATENT DOCUMENTS

| CN | 1635409 A | 7/2005 |
| CN | 201403234 Y | 2/2010 |
| CN | 101929636 A | 12/2010 |
| CN | 201946274 U | 8/2011 |
| CN | 102243854 A | 11/2011 |
| CN | 102280089 A | 12/2011 |
| CN | 102298909 A | 12/2011 |
| JP | 2010-45223 A | 2/2010 |
| KR | 10-2008-0079046 A | 8/2008 |

OTHER PUBLICATIONS

Zhang Honglei, the International Searching Authority written comments, Mar. 2013, CN.

* cited by examiner

Primary Examiner — Jimmy Vu
(74) Attorney, Agent, or Firm — Ipro, Inc.; Na Xu

(57) ABSTRACT

The driving circuit for a light emitting diode (LED) backlight includes at least two lightbars arranged in parallel connection. An output end of each of the LED lightbars is coupled with a converter module, and the converter module is configured with a digital potentiometer balancing a voltage difference between the LED lightbars and adjusting a resistance by an electric signal. In the present disclosure, the digital potentiometer adjusting the resistance by the electric signal is arranged in the converter module connected with the LED lightbar in series, and the resistance of the digital potentiometer is dynamically adjusted according to the resistance of different LED lightbars during use. Thus, the total voltage of each LED lightbar and the digital potentiometer connected with the LED lightbar in series is constant.

11 Claims, 2 Drawing Sheets

DRIVING CIRCUIT FOR LED BACKLIGHT, LCD DEVICE, AND METHOD FOR MANUFACTURING DRIVING CIRCUIT FOR LED BACKLIGHT

TECHNICAL FIELD

This application is a national stage application of PCT application PCT/CN2012/077498 filed on Jun. 26, 2012, which is based on and claims priority to Chinese patent application 201210208002.0 filed on June 6, China. The entirety of each of the above-mentioned applications is hereby incorporated by reference herein in its entirety.

The present disclosure relates to the field of liquid crystal displays (LCDs), and more particularly to a driving circuit for a light emitting diode (LED) backlight, an LCD device, and a method for manufacturing a driving circuit for an LED backlight.

BACKGROUND

A liquid crystal display (LCD) device includes an LCD panel and a backlight module. In the backlight module using a light emitting diode (LED), if a plurality of LED lightbars are used, as shown in FIG. 1 and FIG. 2, the LED lightbars are arranged in parallel connection. Each LED lightbar is connected in series to a same converter, a control chip is arranged in the converter, and the control chip is coupled with an output end of each LED lightbar. Voltages of all LED lightbars are different, namely $V_{F1}$, $V_{F2}$, $V_{F3}$, and $V_{F4}$ are unequal, and branch voltage $V_{LED}$ of the whole LED lightbar is equal, which result in the difference of $V_{LED1}$, $V_{LED2}$, $V_{LED3}$, and $V_{LED4}$ applied onto the control chip of the converter. Current is generated when voltage differences exist, thereby increasing temperature of the control chip used in the converter of the backlight drive. To solve the temperature problem, a thermal pad or a bare copper is required to be added, thereby increasing cost.

SUMMARY

In view of the above-described problems, the aim of the present disclosure is to provide a driving circuit for an light emitting diode (LED) backlight, a liquid crystal display (LCD) device, and a method for manufacturing a driving circuit for an LED backlight, which are low cost and reduce temperature of a control chip of a converter of a backlight drive.

The aim of the present disclosure is achieved by the following technical scheme.

A driving circuit for an LED backlight comprises at least two lightbars arranged in parallel connection. An output end of the LED lightbar is coupled with a converter module. The converter module is configured with a digital potentiometer balancing a voltage difference between LED lightbars and adjusting a resistance by an electric signal.

In one example, the converter module comprises a control chip. One end of each digital potentiometer is coupled to the output end of one LED lightbar in series, and the other end is coupled to the control chip in series. This is a specific circuit structure of the converter module.

In one example, the converter module further comprises an isolating switch. The digital potentiometer is coupled to the control chip in series by the isolating switch. By adding the isolating switch, the isolating switch is disconnected when the LED lightbar is short-circuited, thereby preventing all the branch voltages from being applied onto the control chip and damaging the control chip.

In one example, the converter module further comprises a connector. The digital potentiometer is coupled to the output end of the LED lightbar in series by the connector. The use of the connector facilitates the overhaul of the converter module. During overhaul, the converter module can be individually separated from the driving circuit by disconnecting the connector.

In one example, except an LED lightbar with maximum voltage difference, each of the rest LED lightbar is in series connection with one digital potentiometer, respectively. By taking the voltage of the LED lightbar with maximum voltage difference as a reference voltage, on the one hand, the resistor of one LED lightbar is saved, on the other hand, because the reference voltage is low, each of the rest LED lightbar is in series connection with a resistor with low resistance, respectively. Thus, the consumption of the electric energy on the resistors is reduced, thereby favoring the reduction of energy consumption.

An LCD device comprises the driving circuit for the LED backlight mentioned above.

A method for manufacturing a driving circuit for an LED backlight comprises a step A: Connecting a converter module to an output end of each of LED lightbars in series, and arranging a digital potentiometer which balances a voltage difference between LED lightbars and adjusts a resistance by an electric signal.

In one example, the step A comprises:

A1: Calculating the voltage difference of two ends of each LED lightbar, and taking a maximum voltage difference as a reference voltage; and A2: Connecting each branch of the rest LED lightbars with one digital potentiometer in series except an LED lightbar having the reference voltage; and adjusting dynamically the resistance of each digital potentiometer by the electric signal. Thus, a total voltage difference of the LED lightbar and the digital potentiometer is equal to the reference voltage. By taking the voltage of the LED lightbar with the maximum voltage difference as the reference voltage, on the one hand, the resistor of one LED lightbar is saved, on the other hand, because the reference voltage is low, each of the rest LED lightbar is in series connection with the resistor with low resistance. Thus, consumption of the electric energy on the resistor is reduced, thereby favoring reduction of energy consumption.

In one example, in the step A, the converter module comprises a control chip. One end of each digital potentiometer is coupled to the output end of one LED lightbar in series, and the other end is coupled to the control chip in series. This is a specific circuit structure of the converter module.

In one example, in the step A, the converter module further comprises an isolating switch and a connector; one end of the digital potentiometer is coupled to the control chip in series by the isolating switch. The other end of the digital potentiometer is coupled to the output end of the LED lightbar in series by the connector. By adding the isolating switch, the isolating switch is disconnected when the LED lightbar is short-circuited, thereby preventing all the branch voltages from being applied onto the control chip and damaging the control chip. The connector facilitates the overhaul of the converter module. During the overhaul, the converter module can be individually separated from the driving circuit by disconnecting the connector.

In the present disclosure, the digital potentiometer adjusting the resistance by the electric signal is arranged in the converter module connected with the LED lightbar in series, which enables the total voltage of each LED lightbar and the digital potentiometer connected with the LED lightbar in series to be constant. Thus, the voltages of all pins of the control chip coupled into a drive converter can be constant, no voltage differences exist between pins basically, and no additional current can be generated. Thus, the power consumption of the control chip is reduced, and the heat productivity of the control chip is reduced, thereby reducing the temperature of the control chip. In addition, with the temperature rise of the LED lightbar during use, the resistance will be changed. By using the digital potentiometer, the resistance can be automatically adjusted by a digital command mode at any time during use; thus, in the conditions of different temperature, the total voltage of each LED lightbar and the digital potentiometer connected with the LED lightbar in series is constant, thereby effectively reducing the heat productivity of the control chip.

DETAILED DESCRIPTION

A liquid crystal display (LCD) device comprises a backlight module. The backlight module is configured with a driving circuit for a light emitting diode (LED) backlight. The driving circuit for the LED backlight comprises at least two lightbars arranged in parallel connection, an output end of each of the LED lightbars is coupled with a converter module, and the converter module is configured with a digital potentiometer which balances a voltage difference between the LED lightbars and adjusts a resistance by an electric signal.

In the present disclosure, the digital potentiometer adjusting the resistance by the electric signal is arranged in the converter module connected with the LED lightbar in series, which enables the total voltage of each LED lightbar and the digital potentiometer connected with the LED lightbar in series to be constant. Thus, the voltages of all pins of the control chip coupled into a drive converter can be constant, no voltage differences exist between pins basically, and no additional current can be generated. Thus, power consumption of the control chip is reduced, and heat productivity of the control chip is reduced, thereby reducing temperature of the control chip. In addition, with the temperature rise of the LED lightbar during use, the resistance will be changed. By using the digital potentiometer, the resistance can be automatically adjusted by a digital command mode at any time during use. Thus, in the conditions of different temperature, the total voltage of each LED lightbar and the digital potentiometer connected with the LED lightbar in series is constant, thereby effectively reducing the heat productivity of the control chip. The driving circuit for the LED backlight of the present disclosure will be further described in accordance with the figures and preferred examples.

Figure 1:
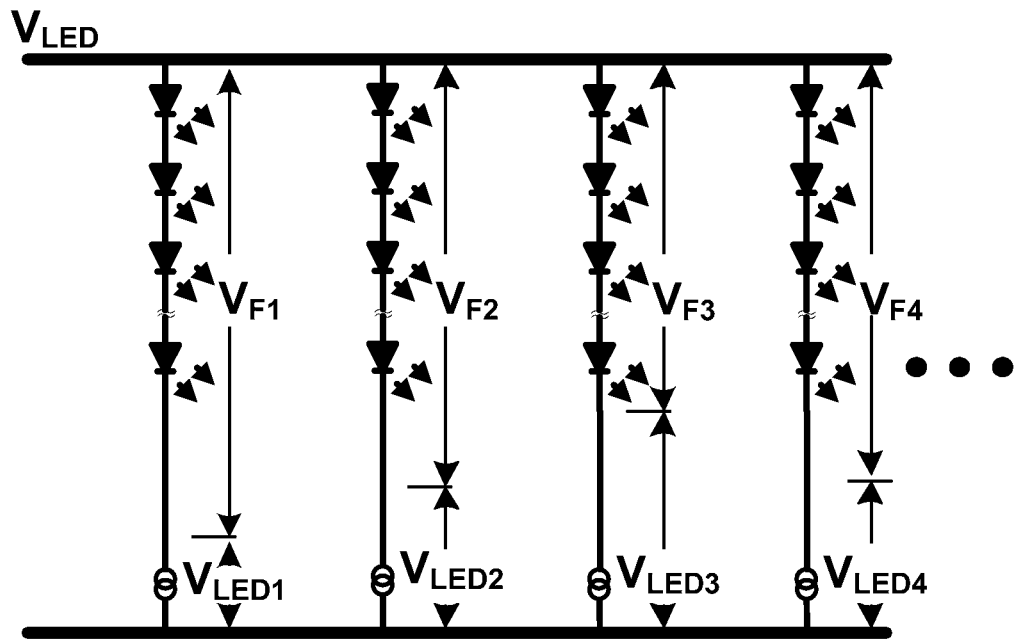
FIG. 1 is a schematic diagram of a typical driving circuit for an LED backlight.
Figure 2:
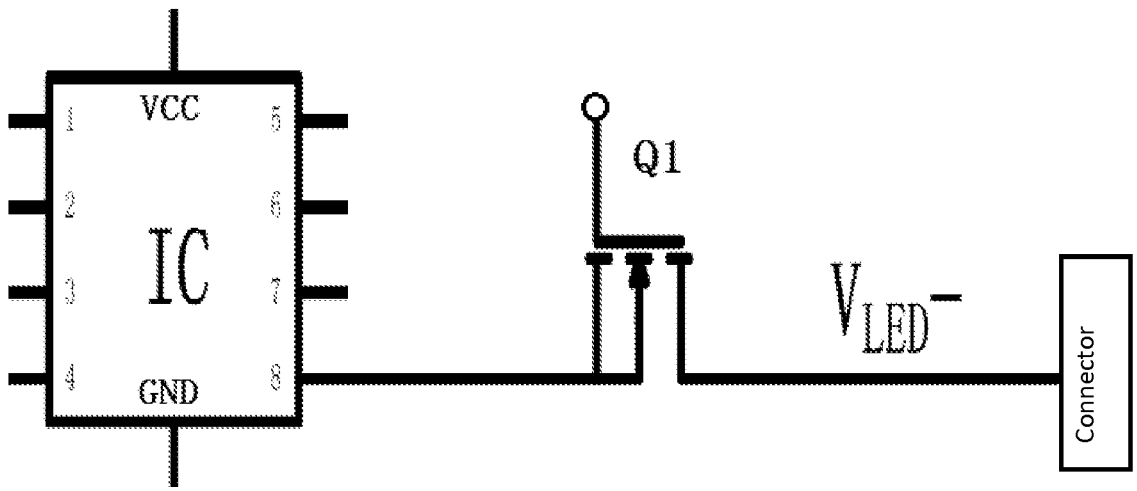
FIG. 2 is a schematic diagram of a driving circuit for an LED backlight with an isolating switch.
Figure 3:
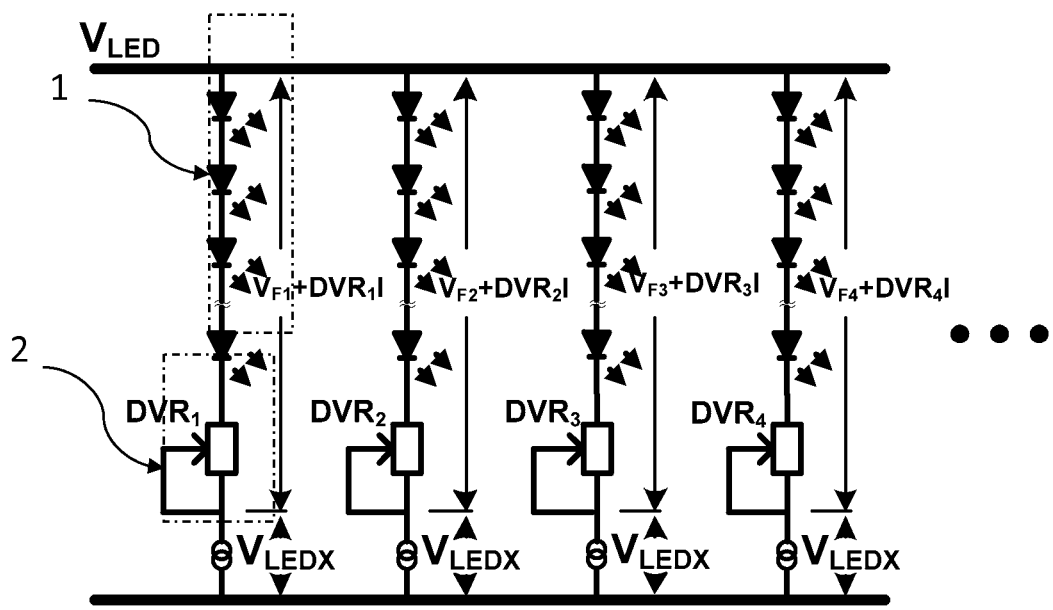
FIG. 3 is a schematic diagram of a driving circuit for an LED backlight of an example of the present disclosure.

As shown in FIG. 3, there are four LED lightbars 1 in the figure. Each digital potentiometer of the converter module 2 is connected with one LED lightbar 1, the digital potentiometer is $DVR_1$, $DVR_2$, $DVR_3$, and $DVR_4$, respectively. Thus, the resistance of a branch of each LED lightbar 1 is adjustable. Furthermore, except an LED lightbar a with maximum voltage difference, each of the rest LED lightbar 1 is in series connection with one digital potentiometer adjusting the resistance by the electric signal, respectively. By taking the voltage of the LED lightbar 1 with maximum voltage difference as a reference voltage, on the one hand, a resistor of one LED lightbar 1 is saved, on the other hand, because the reference voltage is low, each of the rest LED lightbar 1 is in series connection with one resistor with low resistance, respectively. Thus, the consumption of the electric energy on the resistor is reduced, thereby favoring reduction of energy consumption.

Figure 4:
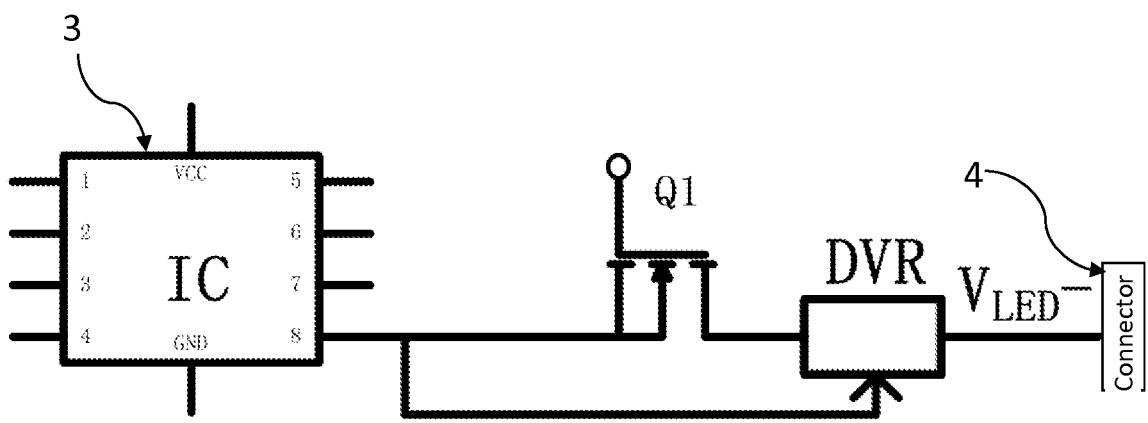
FIG. 4 is a schematic diagram of a driving circuit for an LED backlight with an isolating switch of an example of the present disclosure.

Furthermore, as shown in FIG. 4, the converter module further comprises an isolating switch Q1 and a connector 4; one end of the digital potentiometer DVR is coupled to the control chip in series by the isolating switch Q1, and the other end of the digital potentiometer DVR is coupled to the output end of the LED lightbar 1 in series by the connector 4. By adding the isolating switch, the isolating switch is disconnected when the LED lightbar is short-circuited, thereby preventing all the branch voltages from being applied onto the control chip 3 and damaging the control chip 3. The connector 4 facilitates overhaul of the converter module 7. During the overhaul, the converter module 2 can be individually separated from the driving circuit by disconnecting the connector 4.

The present disclosure further provides a method for manufacturing a driving circuit for an LED backlight. We can measure the voltages, such as $V_{F1}, V_{F2}, V_{F3}, V_{F4}\ldots$, of all the LED lightbars under a required current I after manufacturing each LED lightbar. Thus, an LED lightbar with maximum voltage is measured, and the voltage thereof is set to be $V_{FX}$. After that, connecting in series each of the rest LED lightbars with a digital potentiometer adjusting dynamically a resistance thereof by an electric signal. Thereof, $V_{F1}+DVR_1=V_{F2}+DVR_2=V_{F3}+DVR_3=V_{F4}+DVR_4= \ldots =V_{FX}$. Under the condition of certain total $V_{LED}$, the total voltage of the LED lightbar and the digital potentiometer is constant, and then the voltage difference between the pins of the control chip of the converter module is low, namely $V_{LEDX}$ keeps constant and closest approaches to the required voltage of the control chip, thereby reducing the heat productivity of the control chip.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

I claim:
1. A driving circuit for a light emitting diode (LED) backlight, comprising:
at least two lightbars arranged in parallel connection;
wherein an output end of each LED lightbar is coupled with a converter module, and the converter module is configured with a digital potentiometer for balancing a voltage difference between the LED lightbars and adjusting a resistance by an electric signal; wherein the converter module comprises a control chip; one end of each digital potentiometer is coupled to the output end of one LED lightbar in series, and the other end is coupled to the control chip in series.

2. The driving circuit for the LED backlight of claim 1, wherein the converter module further comprises an isolating switch; the digital potentiometer is coupled to the control chip in series by the isolating switch.

3. The driving circuit for the LED backlight of claim 1, wherein the converter module further comprises a connector; the digital potentiometer is coupled to the output end of the LED lightbar in series by the connector.

4. The driving circuit for the LED backlight of claim 1, wherein except an LED lightbar with maximum voltage difference, each of the rest LED lightbar is in series connection with the one digital potentiometer, respectively.

5. A liquid crystal display (LCD) device, comprising:
a driving circuit for an LED backlight;
wherein the driving circuit for the LED backlight comprises at least two lightbars arranged in parallel connection; and
wherein an output end of each LED lightbar is coupled with a converter module, and the converter module is configured with a digital potentiometer for balancing a voltage difference between the LED lightbars and adjusting a resistance by an electric signal; wherein the converter module comprises a control chip; one end of each digital potentiometer is coupled to the output end of one LED lightbar in series, and the other end is coupled to the control chip in series.

6. The LCD device of claim 5, wherein the converter module further comprises an isolating switch; the digital potentiometer is coupled to the control chip in series by the isolating switch.

7. The LCD device of claim 5, wherein the converter module further comprises a connector; the digital potentiometer is coupled to the output end of the LED lightbar in series by the connector.

8. The LCD device of claim 5, wherein except an LED lightbar with maximum voltage difference, each of the rest LED lightbar is in series connection with the one digital potentiometer, respectively.

9. A method for manufacturing a driving circuit for a light emitting diode (LED) backlight, comprising:
a step A: connecting a converter module to an output end of each LED lightbar in series, and arranging a digital potentiometer which balances a voltage difference between the LED lightbars and adjusts a resistance by an electric signal in the converter module; wherein in the step A, the converter module comprises a control chip; one end of each digital potentiometer is coupled to the output end of one LED lightbar in series, and the other end is coupled to the control chip in series.

10. The method for manufacturing the driving circuit for the LED backlight of claim 9, wherein the step A comprises:
A1: calculating the voltage difference of two ends of each LED lightbar, and taking a maximum voltage difference as a reference voltage; and
A2: connecting each branch of the rest LED lightbars with one digital potentiometer in series except an LED lightbar having the reference voltage; and adjusting dynamically the resistance of each digital potentiometer by the electric signal; thus, a total voltage difference of the LED lightbar and the digital potentiometer is equal to the reference voltage.

11. The method for manufacturing the driving circuit for the LED backlight of claim 9, wherein in the step A, the converter module further comprises an isolating switch and a connector; one end of the digital potentiometer is coupled to the control chip in series by the isolating switch; and the other end is coupled to the output end of the LED lightbar in series by the connector.

* * * * *